Nov. 20, 1945.   J. P. KRIECHBAUM   2,389,439
CONDITION CONTROL SYSTEM
Filed March 2, 1942
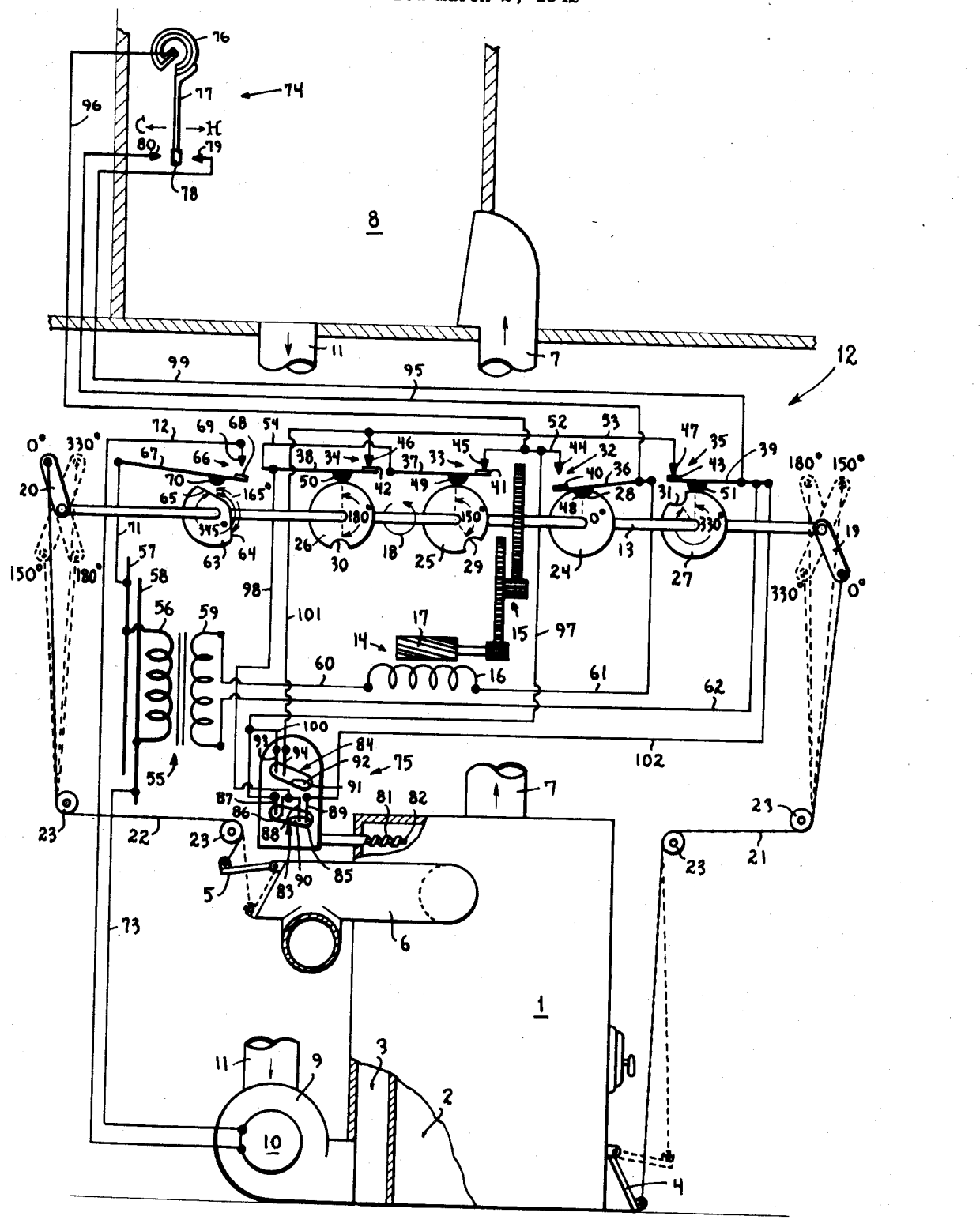
INVENTOR.
John P. Kriechbaum
BY George H. Fisher
Attorney Patented Nov. 20, 1945

2,389,439

UNITED STATES PATENT OFFICE 2,389,439

CONDITION CONTROL SYSTEM

John P. Kriechbaum, Minneapolis, Minn., assignor to Minneapolis-Honeywell Regulator Company, Minneapolis, Minn., a corporation of Delaware Application March 2, 1942, Serial No. 432,983

3 Claims. (Cl. 236—9)

This invention relates to condition control systems, particularly of the type wherein a single control means provides the dual function of controlling a condition changer and a means for circulating a condition exchange medium between the condition changer and a space in which a normal condition value of the medium is to be maintained.

In condition control systems of this type the control means is, in turn, controlled by a plurality of circuits, each control circuit providing a control position of the control means corresponding to a particular control condition of the condition changer and circulator means necessary to maintain a normal condition value of the medium in the space.

Generally, each control circuit comprises one or more switch means responsive to variations in the condition value of the medium in the space and/or in the condition changer for initiating operation of the control means and switch means actuated by the control means for terminating operation thereof. Such circuit arrangements necessarily involve complicated control circuits, the complications of which increase with each new control position added to the system.

A broad object of this invention is to provide improvements in condition control systems of this type, especially with respect to the control circuits forming a part thereof.

More particularly, an object of this invention is to provide simplifications in the arrangement and parts of such control circuits.

Another object of this invention is to provide a simple circuit including such control means for providing a plurality of control positions thereof, and a plurality of simple shunting circuits for initiating operation of the control means.

A further object of this invention is to provide a minimum number of such shunting circuits capable of controlling a plurality of controlled conditions of the condition changer and the circulating means necessary to maintain the normal condition value of the medium in the space.

Another object of this invention is to provide a simple circuit including an electrical motor and a plurality of switch means operated thereby and connected in series therewith for terminating the operation thereof, and a plurality of simple circuits for shunting one or more of the switch means to initiate operation of the motor.

A further object of this invention is to provide a simple circuit including an electric motor and a plurality of switch means operated thereby and connected in series therewith for terminating the operation thereof which also serves as a holding circuit for insuring continued operation of the electric motor between terminated positions thereof.

Other objects are those implied or inherent in the novel combination and arrangement of parts hereinafter specifically described and claimed, reference being had to the accompanying drawing, in which the figure shown is a schematic view of a condition control system embodying the principles of this invention.

For an embodiment best illustrative of the principles of this invention I have selected a condition control system in which the condition changer is a hot air furnace generally designated by the numeral 1 and comprising the usual combustion chamber 2, air inclosure or bonnet 3 partially surrounding the combustion chamber, a draft damper 4 associated with the combustion chamber, and check damper 5 suitably carried by the stack 6 in the usual manner.

Leading from the bonnet 3 at the top of the furnace is a supply duct 7 which communicates with a space 8 to which air warmed in the bonnet is to be supplied. A circulating fan 9 having an operating motor 10 is provided for drawing the cooled air from the space 8 through a return duct 11 and forcing the air through the bonnet and supply duct 7 into the space 8.

For controlling operation of the dampers 4 and 5 and the fan motor 10, a damper motor generally designated 12 is provided. The damper motor comprises an operating shaft 13 driven by a motor 14 through a suitable reduction gear 15. The motor 14 is of the uni-directional type being, as shown, a squirrel cage induction motor having a single energizing winding 16 and a rotor 17. The motor drives the shaft 13 in a counterclockwise direction as indicated by the arrow 18.

Suitably mounted on the operating shaft 13 is a pair of arms 19 and 20 which are inter-connected with the dampers 4 and 5 respectively by any suitable means such as chains 21 and 22 which may be trained over a convenient number of pulleys 23 as is necessary for each particular installation.

Also secured to shaft 13 is a plurality of cams 24, 25, 26 and 27, each having in its periphery an indentation 28, 29, 30 and 31 respectively. The cams are so arranged on shaft 13 that each indentation bears a definite circumferentially displaced relation with respect to the other indentations. For example, taking indentation 28 as a datum, then the indentation 29 is disposed at 150°, indentation 30 at 180°, and indentation 31 at 330° from the indentation 28, all for purposes hereinafter to appear.

Associated with cams 24, 25, 26 and 27 and actuated thereby is a plurality of switches 32, 33, 34 and 35, each having a movable blade 36, 37, 38 and 39, a contact 40, 41, 42 and 43 carried thereby, a fixed contact 44, 45, 46 and 47 engageable with the movable contacts, and a cam follower of insulating material 48, 49, 50 and 51 respectively, each cam follower being adapted to drop into its cooperating indentation 28, 29, 30, 31 as it becomes radially aligned therewith.

Fixed contacts 44 and 45 are connected by a suitable electrical conductor 52, and contacts 46 and 47 are connected by a conductor 53. Movable blades 37 and 38 are also connected by a suitable electrical conductor 54.

From the foregoing it appears that the conductors between the switches 32, 33, 34, and 35 provide a series connection between them as follows: beginning at blade 36, through contacts 40 and 44, conductor 52, contacts 45 and 41, switch blade 37, conductor 54, switch blade 38, contacts 42 and 46, conductor 53, contacts 47 and 43, and thence to switch blade 39. This connection forms a part of a simple circuit for energizing motor winding 16, the energization of which is supplied by a transformer generally designated 55. The transformer 55 comprises a primary winding 56 connected to line 57, 58 which may be supplied by any suitable A. C. source, not shown, and a secondary winding 59. The circuit for motor 14, then, is as follows: from secondary winding 59 through a conductor 60, motor winding 16, conductor 61, limit switches 32, 33, 34 and 35, and conductors 62 back to secondary winding 59. The cam followers 48, 49, 50 and 51 are preferably formed of any suitable insulation material to prevent a flow of current between the limit switches along the shaft 13.

It is evident that as a result of the series connection between the limit switches, any one of them is capable of breaking the control circuit for the motor 14 when its respective cam follower drops into its co-acting indentation in its actuating cam. Moreover, because of the circumferential displacement of the indentation, but one switch is opened at any instant.

Also secured to shaft 13 is a cam 63 which also bears a definite circumferential displacement with respect to the limit switch actuating cams, the leading edge 64 being shown, for example, as displaced 165° from indentation 28 of cam 24 and the trailing edge 65 being disposed 345° from the indentation 28 for a purpose hereinafter to appear.

Associated with cam 63 and actuated thereby, is a switch means 66 which comprises a movable blade 67, a movable contact 68 carried by blade 67, a fixed contact 69 engageable with contact 68, and a cam follower 70 of insulating material engageable by cam 63 and also carried by blade 67. Switch 66 controls the energization of fan motor 10, the circuit to the motor being as follows: from line 57 through conductor 71, switch 66, conductor 72, motor 10, and through conductor 73 back to line 58.

For initiating operation of the control motor 14 to adjust shaft 13 to a position corresponding to a particularly controlled condition of the furnace 1 and circulating fan 9, a plurality of circuits are provided for shunting one or more of the switches so as to provide continuous operation of the motor 14 until the particular switch is opened which provides a position of shaft 13 corresponding to the controlled condition desired. The various shunting circuits required to initiate the movement of the control motor 14 are established by a pair of thermostatic means 74 and 75 responsive to variations in the temperature of the space 8 and furnace 1, respectively.

As shown in the drawing the thermostatic means 74 is a conventional single pole, double throw thermostat which comprises a bimetallic strip 76 to which is suitably attached a contact blade 77. The contact blade 77 carries a contact 78 which is engageable with a pair of fixed contacts 79 and 80.

As shown in the drawing, the thermostatic means 75 is a conventional bonnet thermostat comprising a helical bimetallic strip 81 which is inserted in the bonnet 3 of the furnace 1. The strip 81 actuates a rod 82 in the usual manner, the rod 82 in turn, actuating a pair of mercury switches 83 and 84. The switch 83 comprises a glass envelope 85 and two pairs of electrodes 86, 87 and 88, 89, the electrodes 86 and 88 being joined to provide a common terminal. Each pair of electrodes may be electrically connected by a globule of mercury 90 sealed in the envelope in the usual manner. The switch 84 similarly comprises a glass envelope 91 and a globule of mercury 92 for electrically connecting a pair of electrodes 93 and 94.

As shown, the switch 83 is slightly inclined with the horizontal in which position the electrodes 88 and 89 are electrically connected, the electrodes 86 and 87 becoming electrically connected upon a rise in temperature of the bonnet 3 to a predetermined value. The switch 84 is further inclined in the same direction for the purpose of short circuiting its electrodes 93 and 94 at a considerably higher bonnet temperature than the temperature at which electrodes 86 and 87 of switch 83 would become connected, and as such, the switch 84 constitutes a limit control for preventing continued operation of the furnace at an unsafely high value, as will hereinafter appear.

In operation, with the parts in the position as shown in the drawing, arm 19 is in the full line position which corresponds to a closed position of the damper 4, arm 20 is in its full line position which corresponds to an open position of check damper 5, the cam 63 is in a position in which the fan switch 66 is opened and the fan motor 10 is inoperative, and cam 24 is in a position such that switch 32 is opened and motor 14 is inoperative.

Assume now that the temperature in space 8 drops below a normal value, the blade 77, then moves to the left in the direction of legend C and contact 78 engages fixed contact 80 which establishes a circuit for shunting switch 32, and establishes a circuit for energizing the motor 14 as follows: from secondary winding 59 through conductor 60, motor winding 16, wire 61, conductor 95, contact 80, contact 78, blade 77, strip 76, a conductor 96, conductor 52, switch 33, conductor 54, switch 34, conductor 53, and switch 35, thence through conductor 62 back to secondary winding 59. Motor 14 then operates until switch 33 is opened and the arm 19 moves to the dotted line position marked 150° in which position draft damper 4 is in its open position as indicated by the dotted lines. The arm 20 simultaneously moves to the dotted line position marked 150° in which position the check damper 5 is closed as indicated by the dotted line position.

The furnace 1 then operates at an increased capacity and the temperature in the bonnet rises to a point where the switch 83 is tilted by the bimetallic element 81 in a counter-clockwise direction to such an extent that the electrodes 86 and 87 are electrically connected. This establishes a circuit shunting the limit switch 33, and energizing the motor 14. This circuit may be traced as follows: from secondary winding 59 through conductor 60, motor winding 16, conductor 61, switch 32, conductor 52, a conductor 97, electrodes 86 and 87, a conductor 98, switch blade 38, switch 34, conductor 53, switch 35 and conductor 62 back to secondary winding 59. Motor 14 then operates until switch 34 is opened. During this operation, motor 14 drives arms 19 and 20 to the dotted line positions marked 180°. The draft damper 4 and check damper 5 remain substantially in their dotted line positions to which they were driven on the previous operation of the motor. This operation of motor 14 also drives the leading edge 64 of cam 63 into engagement with the cam follower 70, lifting the latter so that the switch 66 is closed, thereby energizing the fan motor 10 and driving the fan 9 to supply the warmed air to the space 8.

When the temperature in the space 8 has reached a predetermined value as determined by the differential of the thermostat 74 the contact 78 engages the fixed contact 79 which establishes a circuit shunting all of the switches except switch 32. This circuit energizes motor 14 and may be traced as follows: from secondary winding 59 through conductor 60, motor winding 16, wire 61, switch 32, conductor 52, conductor 96, strip 76, blade 77, contacts 78 and 79, a conductor 99, and conductor 62 back to secondary winding 59. Motor 14 then operates until the switch 32 is opened in which position the parts again occupy the position as shown in full lines on the drawing and one cycle of operation has been completed.

Assume that shaft 13 has been driven to its 180° position, wherein, as previously explained, switch 34 is open, draft damper 4 is open, the check damper 5 is closed, and the circulating fan 10 is operating. Assume further that the temperature in the bonnet rises to an unsafely high value before the space thermostat has become satisfied. Under such conditions the switch 84 is tilted by bimetallic element 81 to a position in which the electrodes 93 and 94 are electrically connected thereby establishing an energizing circuit for motor 14 which shunts limit switches 33 and 34 and may be traced as follows: from secondary winding 59, through conductor 60, winding 16, conductor 61, switch 32, conductor 52, conductor 97, conductor 100, electrodes 93 and 94, conductor 101, conductor 53, switch 35, and conductor 62 back to secondary winding 59. Motor 14 then operates until switch 35 is actuated. This operation of motor 14 drives arms 19 and 20 to the dotted line position marked 330° in which position the draft damper 4 is closed and check damper 5 is open, each occupying its respective full line position. The cam 63, however, is still in a position in which switch 66 is closed and the fan motor 10 continues to operate. The circulating fan 10, then, continues to supply warmed air to the space 8 until the thermostat 74 becomes satisfied and shunts all of the switches except switch 32. However, if the bonnet 3 cools before the space thermostat 74 becomes completely satisfied so that it is not engaging either of contacts 79 or 80, the switch 83 then assumes the position as shown, in which the electrodes 88 and 89 are electrically connected. This completes a circuit for energizing motor 14 which shunts switches 34 and 35 and may be traced as follows: from secondary winding 59, through a conductor 60, motor winding 16, conductor 61, switch 32, conductor 52, switch 33, conductor 54, conductor 98, electrodes 88, 89, conductor 102, and conductor 62 back to secondary winding 59. In either case, the motor 14 then operates until switch 32 is opened thereby restoring the system to its original condition as previously described.

Assuming again that arms 19 and 20 are in their 180° position, in which switch 34 is opened, assume further that the temperature of the bonnet drops before the room thermostat 74 becomes satisfied. It should be here pointed out that this condition is extremely unusual, since, with the draft damper open and the check damper closed, the furnace usually has sufficient capacity to satisfy ordinary demands. However, in such cases in which the furnace might fail to function properly as, for example, where refueling is neglected or the fuel supply is depleted, or other conditions in which the furnace operates at decreased capacity, it is desirable to shut off the circulating fan to prevent a circulation of cold air to the space. Under such a condition, the switch 83 assumes the position, as shown, in which the electrodes 88 and 89 are electrically connected. This completes a circuit for energizing motor 14 which shunts the switches 34 and 35 and may be traced as follows: from secondary winding 59 through conductor 60, motor winding 16, conductor 61, switch 32, conductor 52, switch 33, conductor 54, conductor 98, electrodes 88 and 89, conductor 102, and conductor 62 back to secondary winding 59. Assuming that the thermostat 74 is not calling for heat, in other words, the contact 78 is not engaging contact 80, the motor 14 will operate until the switch 32 is opened and the system is restored to its original condition as previously described.

Assume, however, that the room thermostat 74 is still calling for heat when the bonnet cools because of continuous operation of the fan 9 for too long a time, such as might be the case under extreme operating conditions as pointed out hereinabove. In such case the switch 83 shunts the switches 34 and 35 and the thermostat 74 shunts switch 32 since the contacts 78 and 80 are in engagement. The motor 14 then operates until the switch 33 is opened, which as previously described, corresponds to the 150° position of shaft 13, in which the draft damper 4 is opened, the check damper 5 is closed and the circulating fan 9 is inoperative. When the bonnet becomes sufficiently warm to close contacts 86, 87 of the switch 83, thereby energizing the motor 14 to close the switch 66, the circulating fan will again be operated until the thermostat 74 is satisfied, thus repeating the cycle.

Assume a condition in which the air in the bonnet has been warmed to such an extent that the switch 83 is tilted to a position in which the electrodes 86 and 87 are electrically connected, and assume further that the shaft 13 is in its 0° position wherein switch 32 is open. Under such conditions, when the thermostat 74 calls for heat, engagement of contacts 78 and 80 shunts the switch 32, and since the switch 83 shunts the switch 33 the motor 14 operates directly to the 180° position in which switch 34 is opened.

From the foregoing, it is now apparent that I have provided a simple motor control circuit and a minimum number of shunting circuits for initiating operation of the motor controlled circuit to provide a plurality of controlled conditions of the furnace and circulating fan. It is further obvious that the motor circuit also serves as a holding circuit to insure continued operation of the motor operator in moving from one control position to another. This function is made possible by the sequential opening and closing of the series connected switches 32, 33, 34 and 35, each of which is opened only for a fraction of a revolution of the operating shaft 13.

While I have demonstrated the utility of such circuits in a condition control system employing a hot air furnace, I do not wish to be strictly limited thereto inasmuch as the principles involved are readily applicable to other systems, such, for example, as water, steam, gas and oil systems in which dampers, valves and the like may be used. Moreover, while I have illustrated and described but a single embodiment of a particular type of condition control system I contemplate all such modifications, additions, and substitutions as would naturally occur to those skilled in the art without departing from the spirit of the invention and the scope of the appended claims.

I claim as my invention:

1. In combination, a furnace for heating a temperature changing medium, regulating means for regulating the temperature changing rate of said furnace, circulating means for circulating said medium to heat a space, electrical control means for controlling the operation of said regulating means and said circulating means, a plurality of switches connected in a series circuit with said electrical control means and moved to open position in sequence by said control means, a first of said switches being moved to open position when said control means is in a position rendering said regulating means and said circulating means both inactive, a second of said switches being moved to open position when said control means is in a position rendering said regulating means active while maintaining said circulating means inactive, a third of said switches being moved to open position when said control means is in a position rendering both said regulating means and said circulating means active, a fourth of said switches being moved to open position when said control means is in a position rendering said regulating means inactive and said circulating means active, a space thermostat switch which closes when cold, a circuit including a direct shunt for first switch controlled by said space thermostat and the remaining three of said series connected switches whereby said control means is energized and moves to that position in which said second switch opens, a first furnace switch responsive to the temperature of said medium which moves to closed position upon rise of the temperature of said medium to a predetermined value, a circuit for shunting said second switch controlled by said first furnace switch and including the remaining three of said series connected switches whereby said control means moves to the position in which said third switch is open, a second furnace switch responsive to the temperature of said medium and which moves to closed position upon an excessive temperature of said medium, a circuit for shunting said second and third switches controlled by said second furnace switch and including the remaining two of said series connected switches whereby said control means moves to the position in which said first switch is open, a space thermostat switch which closes when hot for shunting said second, third and fourth switches, and a third furnace switch responsive to the temperature of said medium which closes when said medium is cold for shunting said third and fourth switches whereby upon the occurrence of either of said conditions said control means returns to its original position in which said first switch is open.

2. In combination, a furnace for heating a temperature changing medium, regulating means for regulating the temperature changing rate of said furnace, circulating means for circulating said medium to heat a space, electrical control means for controlling the operation of said regulating means and said circulating means, a plurality of switches connected in a series circuit with said electrical control means and moved to open position in sequence by said control means, a first of said switches being moved to open position when said control means is in a position rendering said regulating means and said circulating means both inactive, a second of said switches being moved to open position when said control means is in a position rendering said regulating means active while maintaining said circulating means inactive, a third of said switches being moved to open position when said control means is in a position rendering both said regulating means and said circulating means active, a space thermostat switch which closes when cold, a circuit including a direct shunt for said first switch controlled by said spaced thermostat switch and including the remainder of said series connected switches whereby said control means is energized and moves to that position in which said second switch opens, a furnace switch responsive to the temperature of said medium moved to closed position upon rise in the temperature of said medium to a predetermined value, a circuit for shunting said second switch controlled by said furnace switch and including the remainder of said series connected switches whereby said control means moves to the position in which said third switch is opened, and a circuit for returning said control means to its original position, said circuit including said hot space thermostat switch and one of said series connected switches whereby said second and third switches are shunted.

3. In combination, electrical control means for controlling the operation of a furnace regulating means and a circulating means, said electrical control means comprising, a control arm, a circulating switch, a plurality of switches connected in a series circuit with said electrical control means and moved to open position in sequence by said control means, a first of said switches being moved to open position when said control arm is in a position adapted to render the regulating means inactive and to open said circulating switch, a second of said switches being moved to open position when said control arm is in a position adapted to render the regulating means active while maintaining said circulating switch open, a third of said switches being moved to open position when said control arm is in a position adapted to render both the regulating means active and close said circulating switch, and a fourth of said switches being moved to an open position when said control arm is in a position to render the regulating means active and to close said circulating switch, whereby said control means may be caused to assume any of its said four positions by shunting one or more of its switches.

JOHN P. KRIECHBAUM.